Aug. 18, 1970 S. E. JOHNSON 3,524,922
RADIANT HEAT CABLE SUPPORT
Filed Nov. 27, 1967
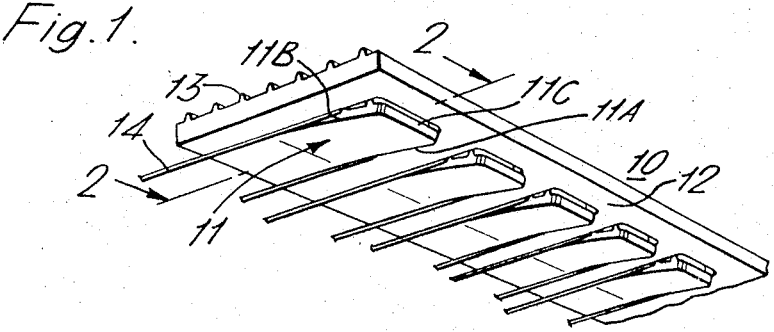
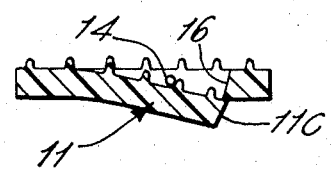
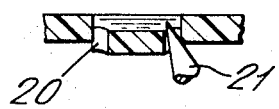
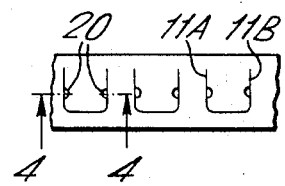
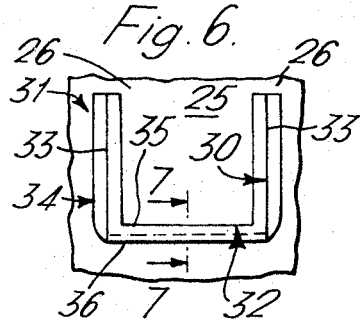
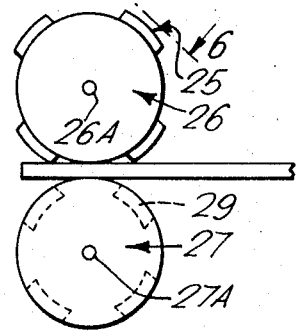
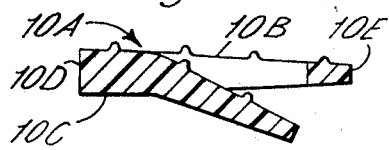
INVENTOR United States Patent Office 3,524,922
Patented Aug. 18, 1970

3,524,922
RADIANT HEAT CABLE SUPPORT
Stanley E. Johnson, 151 Slater St.,
Ottawa 4, Ontario, Canada
Filed Nov. 27, 1967, Ser. No. 685,906
Int. Cl. H01b *17/00;* H05b *3/22;* B26d *1/44*
U.S. Cl. 174—138                    6 Claims

ABSTRACT OF THE DISCLOSURE

An extruded relatively thin anchor strip for radiant heat cable having tabs for anchoring the cable, which tabs are formed by arcuate cuts located inwardly from the marginal edges of the strip and in longitudinal alignment at selected spaced positions along the strip. The tabs have a free end portion overlapping the remainder of the body of the strip to retain the tabs in offset relation facilitating entry of the cable. The tabs further include notches to receive the pointed end of a tool for moving the tab out of the plane of the remainder of the strip. The strip is tapered in cross-section conserving on material and has ribs on one face to facilitate adhesively securing the strip to a wall. The strip is extruded and while being extruded, the tabs are punched in successive relation by passing between a rotatably mounted die and rotatably mounted mandrel. The die has one edge thereof appropriately shaped to provide an angle cut in the strip whereby the free end portion of the tabs is struck outwardly from the strip and have a tapered portion overlapping the remainder of the body of the strip to retain the tabs in the above-mentioned offset relation.

---

This invention relates to an improved anchoring strip for use in holding electric radiant heating cables in position during installation to the combination of a pair of such strips and a resistance heating cable anchored thereto and to a method and apparatus for forming the improved strip.

Radiant heating of buildings is well known and one common type of installation comprises electric heating cables secured to a wall and covered by an overlying layer of plaster. In order to install the cable, it is necessary to secure it to the wall such that it may subsequently be covered with plaster.

Canadian Pat. 726,273, issued Jan. 26, 1966 discloses a radiant heating arrangement wherein the cable is disposed in a serpentine fashion by lacing the same back and forth and anchoring the opposed looped end portions to respective ones of a pair of spaced anchoring strips, the latter of which are secured to the wall. The anchoring strips disclosed in the above patent are substantially U-shaped in cross section with a series of notches cut out from one of the legs to provide a plurality of hooks disposed in spaced relation longitudinally along the length of the strip. The notch extends from a free marginal edge of the strip a selected distance inwardly toward the bight portion.

One disadvantage of a U-shaped strip with notches concerns forming the notch. The notches extend in a direction perpendicular to the length of the strip and accordingly cannot be formed simultaneously with extrusion of the strip. The notches necessitate an operation separate from formation of the strip and require a cutting operation with motion in a direction perpendicular to the length of the strip. Either the cutting assembly or the strip may be moved but in any event, the motion of travel is in a direction normal to the length of the strip. It is evident that formation of the slots requires intermittent movement of the strip, and if not intermittent, then an elaborate cutting device.

It is an object of the present invention to provide an improved anchoring strip where the hooks therein may be formed by a punching operation thus lending the formation of the hooks to a continuous type of operation.

A further object of the present invention is to provide an anchoring strip where the hooks are an integral part of the strip and each located at a position inwardly of the marginal edges of the strip.

A still further object of the present invention is to provide an extruded elongated strip having a plurality of tabs extending therefrom at a relatively small angle to the flat planar surface of the strip.

In accordance with one aspect of the present invention, there is provided an elongated anchor strip made from an electrically insulative material and having a plurality of tabs disposed in selected spaced relation longitudinally therealong, each of said tabs being integral with the remainder of the strip and defined by an arcuate outer edge intersected by an axis disposed substantially perpendicular to the longitudinal marginal edges of the strip.

In accordance with a further aspect, there is provided an anchor strip of the foregoing type wherein each tab is struck outwardly to one side of the strip.

In accordance with a further aspect of the present invention, there is provided a strip of the foregoing type which is relatively resilient having elastic characteristics and including abutment means retaining the free end of each struck-out tab in a position to one side of the strip. In accordance with a restricted form of the invention, at least a portion of the length of the periphery of each tab is cut at an angle with respect to the flat planar surface of the strip such that when the tab is forced through the strip, the abutment is provided by a sloped edge surface on the tab which overlaps the strip thereby holding the tab in the struck-out position.

In a further aspect of the invention, there is provided an extruded strip having a plurality of U shaped cuts spaced longitudinally therealong with an axis of symmetry substantially perpendicular to the length of the strip, each of said cuts providing a tab integral with the remainder of the strip and a notch in a marginal edge of each of said tabs facilitating the insertion of a tool to bend a tab to an operative position.

The invention is illustrated by way of example in the drawings wherein:

FIG. 1 is an oblique view of a portion of an anchoring strip of the present invention;

FIG. 2 is a cross section along section 2—2 of FIG. 1;

FIG. 3 is a bottom plan view of a strip similar to that shown in FIG. 1 but including a modification;

FIG. 4 is a cross section taken along section 4—4 of FIG. 3;

FIG. 5 is a vertical, side view diagrammatically illustrating an apparatus for punching tabs from a strip to form an anchoring strip of the type illustrated in FIG. 1;

FIG. 6 is a view of one of the punching knives or die on the apparatus illustrated in FIG. 5 and is taken substantially along line 6—6;

FIG. 7 is a partial sectional view taken along section 7—7 of FIG. 6; and,

FIG. 8 is a cross section of a modified strip taken along a section similar to section 2—2 in FIG. 1.

Referring to the drawings, shown in FIG. 1 is an anchor strip 10 having a plurality of individual tabs 11 located in spaced relationship longitudinally along the length of the strip. In installation of an electric cable radiant heat system, two of such anchor strips are secured to a wall in spaced relation with respect to one another as is disclosed in the aforementioned Canadian Pat. 726,273. An electric radiant heat cable 14 is then laced back and forth in a serpentine fashion extending from one strip to the other and is engaged by one or more of the tabs on respective ones of the spaced pair of strips by being placed thereunder and thereby anchoring the cable to the wall.

Only one anchoring strip has been illustrated in FIG. 1 and it will be obvious that a similar strip, located in spaced relation with respect thereto, has the tabs directed in a direction away from that illustrated, i.e., the tabs on the spaced pair of strips have the free ends thereof directed away from one another in opposite directions.

The strip 10 is relatively thin having the tabs formed integrally therewith. The strip has a pair of opposed major faces indicated respectively by reference numerals 12 and 13. The tabs have the free ends thereof located to one side of the face 12 and the opposite face 13 is preferably ribbed to facilitate bonding the strip to the wall by a suitable adhesive. The face 12, in an installation, is covered by a layer of plaster as is also the cable 14. The face 12 thus also may, if desired, be ribbed to facilitate bonding of the plaster thereto. Each tab 11 is defined by an arcuate outer edge (preferably U-shaped) and has a pair of opposed side edges 11A and 11B interconnected at one end by a free marginal edge 11C. The portion of the tab opposite to the edge 11C merges into and is integral with the main body portion of the strip 10.

In FIG. 1, the tabs 11 are illustrated as having their free marginal edge 11C spaced from the strip face 12. This relative position of the tab free end and strip body portion facilitates inserting the cable during installation. In order to accomplish this relative position, the tab 11 requires a permanent set, i.e., a bent portion intermediate the free end edge 11C and the opposite end of the tab which merges into the body portion of the strip. The tabs are disposed at a relatively small angle to the strip, for example, they may be inclined approximately 15°–30° with respect to the flat planar surface of the remainder of the strip.

FIG. 4 illustrates a modification which will be discussed hereinafter, where the tabs may remain in the plane of the strip until during installation when a tool is used to bend them outwardly.

The strip 10 is preferably made of an electrical insulating material which is relatively stiff. The strip may be formed of a resinous material such as polyethylene, polypropylene, polyvinylchloride, or the like, or alternatively, it may be formed from a relatively hard or stiff rubber material. In the event the strip is made of a resilient material, i.e., a material which has a memory thus there being a tendency for the tab to return to its position assumed before being struck out from the main body portion, the free end edge 11C may have the face thereof sloped as indicated in FIG. 2. The sloped outer face of the tab may, if desired, correspond to a similarly sloped face 16 on the main body portion of the strip from which the tab is struck in which case the corresponding sloped faces may be formed by a suitable angular cut during formation of the tab.

The resiliency of the material in the above embodiment is chosen such that when the tab is struck outwardly, the edge 11C and/or face 16 deforms permitting the tab end edge to be removed to one side of the strip face 12. After the free end edge clears the face 12, the resiliency of the material returns the sloped faces to a position approaching the original angular cut and thus provides adjacent abutting edges located respectively on the free end of the tab and the face 12 of the strip. This abutment retains the edge of the tab to one side of the strip and permits formation of the strip from a material wherein there need not be a permanent set in the tab. This overlap retains the tab in a position facilitating further opening of the tab to receive a cable when using the strip to install a cable heating system.

Alternatively, the tabs may be formed with a permanent or semi-permanent set, in which event they remain to one side of the face 12 after formation and during storage, thus facilitating insertion of the cable during a heating installation. Since the strips are required in pairs, two strips may be packaged face 12 to face 12 of the respective strips with tabs 11 interleaved, i.e. the tabs 11 on one strip in such case are disposed between respective ones of tabs 11 and the face 12 of the other strip, thus wedging the tabs on the respective strips to retain the same in their struck-outwardly position. This permits using a relatively resilient material.

In the preferred form, the strip is formed by an extrusion process and, as will be seen hereinafter, formation of the tabs may be accomplished by a punching operation. This punching operation may be carried out while the strip moves continuously in a direction parallel to its longitudinal axis and such punching also may occur simultaneously with formation of the strip or as an independent subsequent operation. The strip, however, also may be molded or cast, in which event, the tabs may be formed during the molding operation.

In FIG. 3, there is illustrated a notch 20 in each of the edges 11A and 11B of the tabs. The purpose of such notch is to facilitate inserting the end portion or tip of a tool (such as a slender rod 21 as indicated in FIG. 4) between the tab and the remainder of the strip and thus bend the tab to a position to receive the cable during installation of the heating system. In such an arrangement, a U-shaped cut is made to define the outline of each tab, but instead of striking the tabs outwardly from the strip simultaneously with forming the tabs, they remain in the plane of the strip until the strip is used during installation of the heating cable. This facilitates packaging of the strips.

The strip 10, as previously mentioned, may be formed by extrusion and the tabs 11 may be struck outwardly therefrom by using a punch or die and anvil. Diagrammatically illustrated in FIG. 5 is a plurality of dies 25 attached to the outer periphery of a pivotally mounted wheel 26 disposed in selected spaced relationship with respect to an anvil 27. The wheel and anvil are pivotally mounted on a suitable frame (not shown) respectively by pivot pins 26A and 27A. The outer periphery of the anvil 27 may be either flat or alternatively, have suitable recesses 29 corresponding in shape to the tab to receive the same when struck outwardly by the punch or die 25. A single punch or die 25 is illustrated in FIG. 6 and consists of a generally U-shaped cutter projecting outwardly from the mounting wheel 26. The U-shaped cutter has a pair of legs 30 and 31 interconnected by a bight portion 32. The legs 30 and 31 may be symmetrical in cross section having a sharp knife-like cutting edge 33 which merges into a wider root portion 34 fastened to the mounting member 26. The bight portion 32, however, instead of being symmetrical in cross section, may be shaped as illustrated in FIG. 7. As shown therein, there is a narrow outer cutting edge 35 which merges into a root or wider base portion 36 attached to the base 26, the cross section being non-symmetrical with respect to the radius of the wheel 26. The knife is illustrated in this figure sloping at an angle α with respect to a tangent to the periphery of the wheel 26. The angle α is chosen to provide the desired slope of the face of the tab's end edge 11C and the face 16 of the strip.

The use of dies on the pivoted members 26 and 27 permits continuous movement of the strip during the punching operation to form the tabs. It is obvious, however, that the dies also may be mounted on reciprocating members movable towards and away from an anvil. The disadvantage of the latter, however, necessitates interrupted operation in the movement of the strip or alternatively, an elaborate mounting for the die and anvil.

From the foregoing, it will be seen that there is provided an anchor strip and a method of making the same, such anchor strip having a plurality of hooks provided by tabs defined by a partially cut-out portion from a piece of material, the marginal edge of each tab being located inwardly of the marginal edges of the strip. In anchoring a cable, the major force is taken by the root or end portion of the tab where the same is effectively hingedly connected to the remainder of the strip. Accordingly, the strip may have a tapered cross section, the thick portion being at the junction of the tab and the main body of the strip and diminishing in thickness toward the free end of the tabs. The tapered section obviously conserves material and also the dimensions and material may be chosen so as to provide a relatively thin tab at its free marginal edge 11C. A thin edge obviously facilitates bending the same to one side of the strip face 12 for insertion of the cable. A strip of tapered cross-section is illustrated in FIG. 8 which is a cross-sectional view similar to that taken along section 2—2 of FIG. 1. With reference to FIG. 8, there is illustrated a strip 10A of material having a pair of opposed faces 10B and 10C converging inwardly in a direction from a longitudinal marginal edge 10D toward an opposite longitudinal edge 10E.

As previously mentioned, the sloped face providing an abutment to retain a resilient tab in a struck outwardly position is on the tab edge 11C. Alternatively, or additionally, one or both of the faces of edges 11A and 11B may also be suitably sloped.

The anchoring strip is provided, as previously mentioned, with a series of ribs on the face 13 to facilitate bonding of the strip to a wall when using an adhesive. Obviously, the strip may, alternatively, or additionally, be secured by nailing or stapling. Also the ribs in the face 13 may be suitably chosen in size and spacing relative to the diameter of the cable 14 such that the cable may fit between adjacent ribs as illustrated in FIG. 2. The ribs, accordingly, permit variously positioning the cable with respect to the length of the tabs and, thereby, within certain limits, provides for adjusting the tension of cables anchored in position by the strips.

I claim:

1. An extruded support strip for use in securing electric radiant heat cables to the surface of a wall, said strip comprising a relatively thin semi-rigid elongated strip of electrically insulative material having a plurality of tabs formed integral therewith and located substantially in alignment in selected spaced relation longitudinally along the length of said strip, each of said tabs being defined by a generally U-shaped cut-out portion and having the marginal edges located inwardly of the marginal edges of said strip, said tabs having the free ends thereof offset from one selected face of said strip and overlapping the opposite face of the latter to retain said free ends of the tabs in offset relation.

2. A member as defined in claim 1 wherein said strip is relatively rigid material selected from the group consisting of polyethylene, polypropylene, polyvinylchloride and rubber.

3. A support as defined in claim 1 wherein said strip has a plurality of ribs on said one selected face extending generally parallel to the length of said strip.

4. A member as defined in claim 1 wherein said strip of material is tapered in cross section in a direction perpendicular to the length thereof.

5. A member as defined in claim 4 wherein the taper extends inwardly in a direction toward the free marginal end of said tabs whereby the free end of the tabs is of lesser thickness than the juncture of the tab with the remainder of the strip.

6. An extruded support strip for use in securing electric radiant heat cables to the surface of a wall, said strip comprising a relatively thin semi-rigid elongated strip of electrically insulative material having a plurality of tabs formed integral therewith and located substantially in alignment at selected spaced positions longitudinally along the length of said strip, each of said tabs being defined by a generally U-shaped cut-out portion and having the marginal edges located inwardly of the marginal edges of said strip, each of said tabs having at least one notch in the marginal edge thereof intermediate opposed ends of such edge to facilitate insertion of a tool for removing the free marginal edge of the respective tabs from the plane of the remainder of the strip.

References Cited

UNITED STATES PATENTS

| | | | |
|---|---|---|---|
| 3,015,016 | 12/1961 | Cole | 219—345 |
| 3,200,236 | 8/1965 | Geyer | 219—213 |

FOREIGN PATENTS

| | | |
|---|---|---|
| 465,842 | 6/1950 | Canada. |
| 752,020 | 1/1967 | Canada. |
| 60,015 | 7/1942 | Denmark. |
| 1,225,192 | 2/1960 | France. |

LARAMIE E. ASKIN, Primary Examiner

U.S. Cl. X.R.

83—346, 678; 219—213, 345, 542; 264—145; 338—290, 321